UNITED STATES PATENT OFFICE 2,294,844

PHOSPHATE GLASS BATCH

Frederick Gelstharp, Tarentum, Pa., assignor to Pittsburgh Plate Glass Company, Allegheny County, Pa., a corporation of Pennsylvania No Drawing. Application April 1, 1939,
Serial No. 265,517

2 Claims. (Cl. 106—47)

The present invention relates to phosphate glass and more particularly to a new combination of batch materials from which such glass is produced.

A principal object of the invention is the provision of an improved glass batch suitable for the preparation of phosphate glass, but which contains no free phosphoric acid.

The so-called phosphate glasses are of particular importance in the manufacture of optical lenses. These glasses are composed wholly of phosphates, although for some purposes it is desirable to incorporate therewith other materials. Phosphate glasses afford the only source for many of the lenses having special optical properties, and accordingly they are an important adjunct to the industry.

The ordinary phosphate glass batch uses phosphoric acid as the major ingredient. A consideration of the chemical properties of this material, especially in the anhydrous state, indicates clearly the great hazard present in conjunction with its use. By substituting orthophosphoric acid for anhydrous phosphorous pentaoxide, a portion of the handling risks may be eliminated, but the concentrated acid is so corrosive that considerable hazard remains. Another objection to the use of phosphoric acid in the batch is that the resultant mixture is a pasty mass which must be dried before it can be fused in a glass melting pot. It will at once be obvious that the presence of free phosphoric acid in the batch will be accompanied by a heavy loss of this principal ingredient during the fusing operation, due to the evaporation or volatilization of the acid. The material loss not only increases the cost of manufacture, but also the acid fumes filling the atmosphere immediately adjacent the melting furnace is exceedingly dangerous to both person and property.

Briefly stated, the present invention contemplates the use of a plurality of metallic phosphates in the batch and particularly the selection of aluminum meta-phosphate as the principal constituent of the batch.

Aluminum meta-phosphate is a non-corrosive, non-fuming and non-hygroscopic material which insures its safe and convenient manipulation in the operations preliminary to melting and casting. This material contains over 80 per cent of phosphoric anhydride and accordingly it is not necessary to add supplementary amounts of free phosphoric acid to the batch in order to produce a glass which will contain the required high percentages of phosphorous pentaoxide. Also, because of the fact that there is no free phosphoric acid contained in the batch there will be no distillation of phosphoric anhydride into the atmosphere creating an unbearable acid condition near the melting furnaces.

For the purposes of illustration of glass batches as contemplated by my invention, the following examples may be given:

|  | 1 | 2 | 3 | 4 |
|---|---|---|---|---|
| Aluminum meta-phosphate $Al_2O_3.3P_2O_5$ | 65.0 | 50.63 | 53.83 | 100 |
| Monopotassium phosphate $KH_2PO_4$ | 14.5 |  | 28.90 |  |
| Monosodium phosphate $NaH_2PO_4$ |  | 12.0 |  |  |
| Monomagnesium phosphate $MgH_4(PO_4)_2$ | 27.0 | 21.6 | 21.60 |  |
| Monocalcium phosphate $CaH_4P_2O_8.H_2O$ |  | 27.0 |  |  |
| Boric acid $H_3BO_3$ |  |  | 5.32 |  |

These batches, when fused, produce glasses having percentage compositions of:

|  | 1 | 2 | 3 | 4 |
|---|---|---|---|---|
| $P_2O_5$ | 75.8 | 77.24 | 72.55 | 80.7 |
| $Al_2O_3$ | 14.2 | 9.76 | 10.45 | 19.3 |
| $K_2O$ | 5.0 |  | 10.00 |  |
| $Na_2O$ |  | 3.0 |  |  |
| $MgO$ | 5.0 | 4.0 | 4.0 |  |
| $CaO$ |  | 6.0 |  |  |
| $B_2O_3$ |  |  | 3.00 |  |

The use of aluminum meta-phosphate as the principal constituent of batches suitable for the preparation of phosphate glasses, therefore, provides a simple and economical solution to the problem of eliminating the heretofore existing disadvantages experienced in the production of such glasses. Where special properties are to be imparted to the phosphate glass other materials may be added to the batch without difficulty and the fused glass produced therefrom may be worked by any of the standard processes.

It will at once be obvious that various alterations in the compositions of the batch may be made without departing from the spirit or the scope of the present invention.

What I claim is:

1. A phosphate glass batch comprising from 50 to 100 per cent by weight of aluminum meta-phosphate, from 0 to 26 per cent by weight of an alkali metal monophosphate, and from 0 to 27 per cent by weight of monomagnesium phosphate.

2. A phosphate glass batch comprising approximately 45 per cent of aluminum meta-phosphate, 10 per cent of monosodium phosphate, 19 per cent of monomagnesium phosphate, and 26 per cent of monocalcium phosphate.

FREDERICK GELSTHARP.